UNITED STATES PATENT OFFICE.

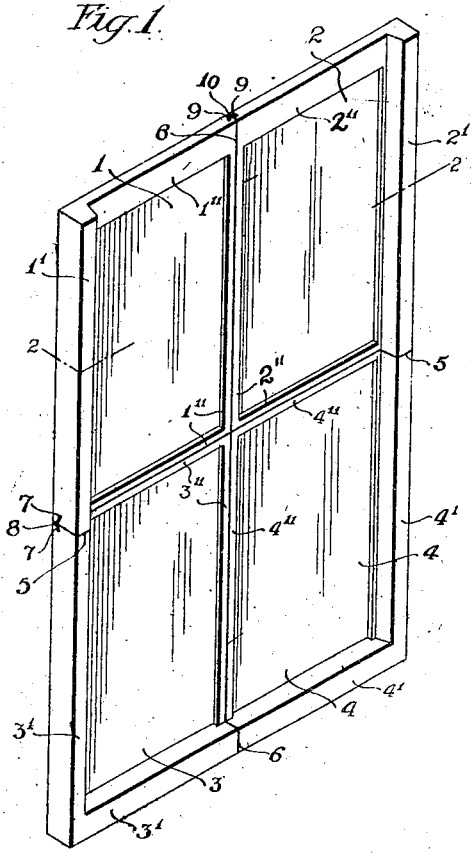

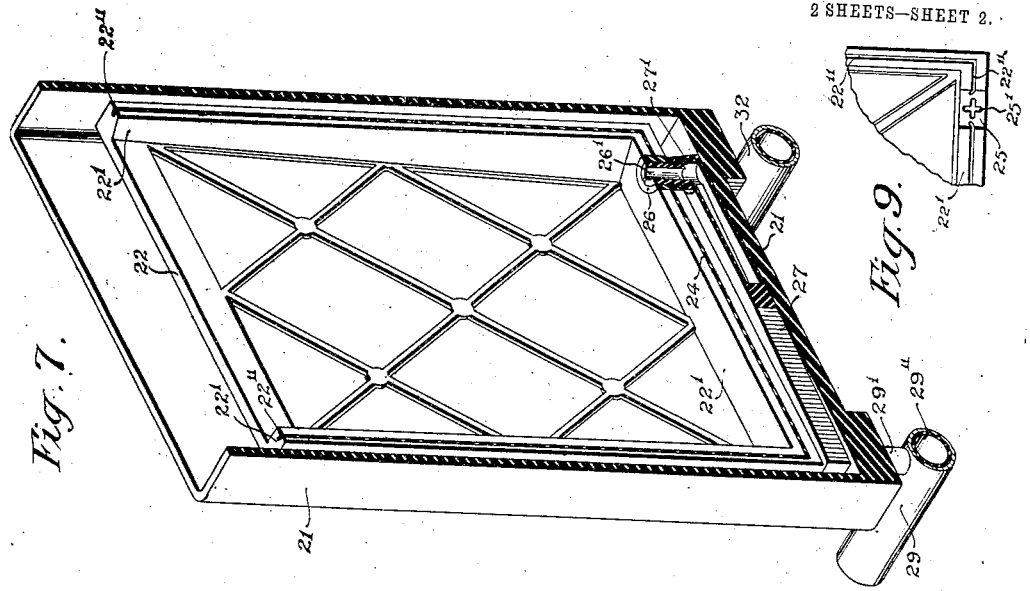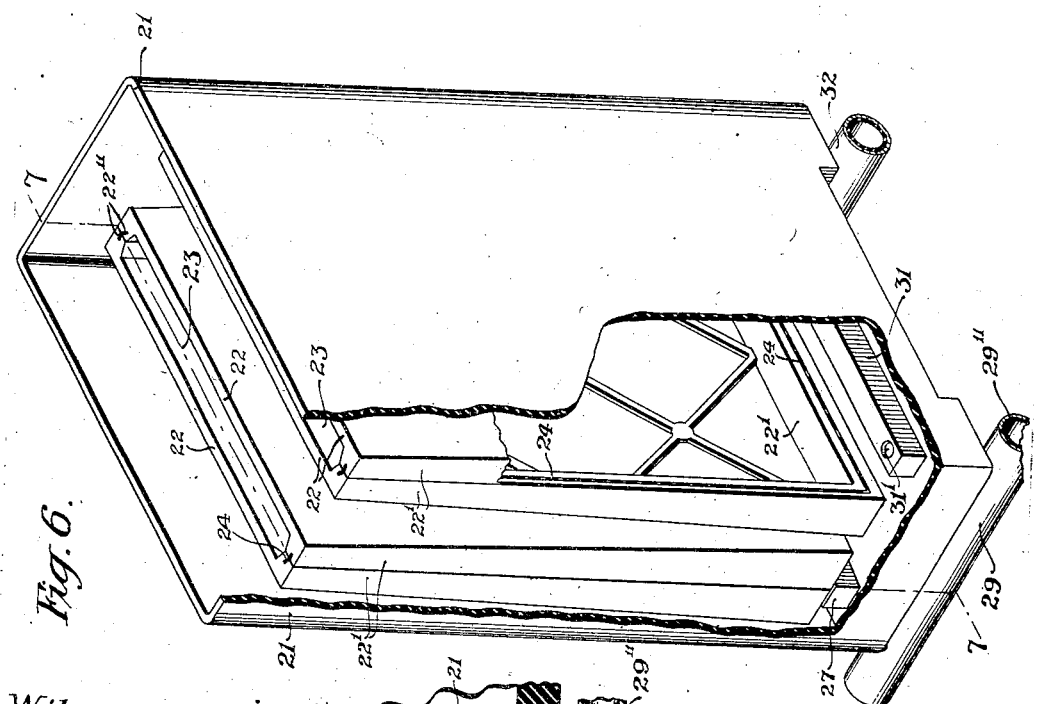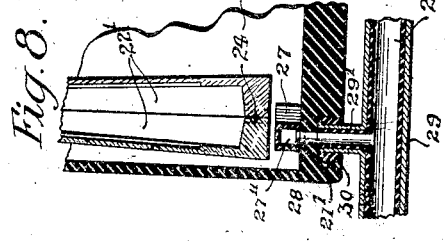

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

CONSTRUCTION OF BATTERIES AND ELECTROLYTIC APPARATUS.

No. 895,732.      Specification of Letters Patent.      Patented Aug. 11, 1908.

Application filed February 11, 1905. Serial No. 245,223.

*To all whom it may concern:*

Be it known that I, FRANK A. DECKER, a citizen of the United States, residing at Philadelphia, county of Philadelphia, and State of Pennsylvania, have invented certain Improvements in the Construction of Batteries and Electrolytic Apparatus, of which the following is a specification.

The primary object of my invention is to provide an insulating seal which will retain, without being affected thereby, the solutions employed in batteries and electrolytic apparatus, and by the use thereof to effectively hold together parts producing a system comprising a cell having low resistance, high efficiency and little or no leakage of either solution or current.

In the accompanying drawings, Figure 1 represents a perspective view of a diaphragm having sections sealed together in accordance with my invention: Fig. 2 represents a sectional view thereof taken on the line 2—2 of Fig. 1: Fig. 3 represents a perspective view, part being broken away for the purpose of illustration, showing a group of plates or diaphragms assembled and sealed together to form liquid holding compartments in accordance with my invention: Fig. 4 represents a sectional view taken on the line 4—4 of Fig. 3: Fig. 5 represents a perspective view of a broken section of a cell showing the parts sealed together in accordance with my invention: Fig. 6 represents a perspective view of a second form of cell constructed in accordance with my invention, parts being broken away for the purpose of illustration: Fig. 7 represents a perspective view in vertical section taken on the line 7—7 of Fig. 6: Fig. 8 represents a sectional elevation taken through part of the cell and a conduit for changing a fluid used therein: and Fig. 9 represents an elevation of a corner of a plate or diaphragm adapted for use in the present improvements, being a portion of the flanged plate shown in Fig. 7 with the bushing removed.

In the views shown in Figs. 1 and 2, the diaphragm represented comprises four sections, 1, 2, 3 and 4, suitably of earthenware or carbon, sealed together on the lines 5—5 and 6—6 by means of the registering, parallel, angularly arranged grooves or sockets 7—7, having rubber 8 packed and vulcanized therein, and the registering, parallel, angularly arranged grooves or sockets 9—9, having rubber 10 packed and vulcanized therein, the joints being made by clamping the sections firmly together in registration after the corresponding grooves have been packed and then heating the plate or portions thereof to be secured together to form solution containers. The several sections are provided with the bordering flanges or ribs 1', 2', 3' and 4', for strengthening and spacing the structure, and with the strengthening ribs 1'', 2'', 3'' and 4'' joined together so as to support the thin porous diaphragm body produced preferably by removing part of the original body.

In the views shown in Figs. 3 and 4, the diaphragms 11 are arranged in parallel positions to bring the bordering flanges 11' together in registration so as to form the compartments or containers 12, the several flanges being provided with the registering, parallel, angularly arranged grooves or sockets 11'' containing rubber 13 packed and vulcanized therein, the grooves being first filled with rubber after which the plates are arranged to bring the grooves into registration and there clamped together during vulcanization.

In the view shown in Fig. 5, a base 14, suitably of rubber or porcelain, is provided with the dove-tail groove or socket 15 for receiving the envelop 16, suitably of lead, the groove having the rubber 17 packed therein and vulcanized so that it secures the envelop and seals the joint between it and the base, the holes 17' being formed in the portion of the envelop contained in the groove so that the rubber will work therethrough and firmly bind the parts together. The receptacle or container thus formed receives the diaphragms 18 having the reinforcing and spacing flanges or ribs 18' thereon which are arranged in parallel relation so as to form the compartments 19. To seal these compartments the bottom flanges 18' are connected together by the rubber joints or seals 20, in the manner described in connection with Figs. 3 and 4, and the side flanges are provided with exterior grooves or sockets 18'' having the rubber 20' packed therein and vulcanized thereto and to the envelop 16, to form seals producing leak proof containers or compartments.

In Figs. 6 to 9 inclusive, there is shown a cell construction having a vulcanized rubber envelop 21 containing cups formed by joining together the diaphragms 22, with their bordering flanges 22' in registration, so as to form the compartments 23. The respective flanges are provided with the registering, parallel, angularly arranged grooves or sockets 22″ having the rubber 24 packed and vulcanized therein, the plates being clamped together with the filled grooves in registration during the vulcanization of the rubber. In the bottom flanges of the plates are formed the sockets 25 intersecting the grooves 22″ and having the irregular recesses 25′ therein. These sockets are joined together, in registration, to form a seat for a rubber bushing 26 which is vulcanized therein integrally with the rubber 24 and held by its penetration into the recess 25′. Secured to the bottom of the envelop 21 is a rubber conduit 27 which is provided with a socket 27′, the interior of the cup being connected with the interior of the conduit by screwing the hollow nipple 26′ into the bushing and socket so as to firmly connect them together and provide an insulating leak proof passage therethrough. The conduit 27 communicates by a passage 28 leading therefrom through the bottom of the envelop or container to the pipe 29, the bottom having a socket 21′ therein for receiving the branch 29′ of the pipe which is secured by the rubber 30 packed and vulcanized in the socket to engage the flange on the branch and seal the joint. The pipe, whose exterior body portion is suitably of lead, has the rubber lining 29″ formed by expanding soft rubber therein and vulcanizing it to form an interior seal throughout the pipe for changing the fluid in the cups. A second fluid, contained in the space or spaces exterior to the cups, can be changed by means of the rubber conduit 31 having the aperture 31′ communicating therewith and connected with a rubber lined pipe 32 as by the connection between the conduit 27 and pipe 29.

Having described my invention, I claim:—

1. In apparatus of the class described, a plurality of battery parts forming several compartments, said parts being secured together and sealed by a plastic vulcanized in place, thereby rendering said compartments liquid tight.

2. In apparatus of the class described, a diaphragm composed of a plurality of parts secured together by rubber vulcanized in place, substantially as specified.

3. In apparatus of the class described, a diaphragm composed of flanged sections secured together by rubber vulcanized in place, substantially as specified.

4. In apparatus of the class described, cups comprising flanged diaphragms bonded together by rubber seals vulcanized in place, substantially as specified.

5. In apparatus of the class described, a cup comprising flanged diaphragms having registering grooves therein, and a seal vulcanized in said grooves and bonding said diaphragms together, substantially as specified.

6. In apparatus of the class described, a cell comprising an envelop, a diaphragm contained in said envelop, and a vulcanized rubber seal connecting said diaphragm and envelop, substantially as specified.

7. In apparatus of the class described, a cell comprising an envelop, diaphragms forming a compartment in said envelop, and vulcanized rubber seals connecting said envelop and diaphragms, substantially as specified.

8. In apparatus of the class described, a cell comprising an envelop, diaphragms contained in said envelop, and vulcanized rubber seals for connecting said diaphragms together and to said envelop, substantially as specified.

9. In apparatus of the class described, a cell comprising a base having a groove therein, an envelop seated in said groove, and a vulcanized rubber seal joining said parts together, substantially as specified.

10. In apparatus of the class described, a cell comprising a base having a groove therein, an envelop seated in said groove, a vulcanized rubber seal joining said parts together, diaphragms forming a compartment in said cell, and vulcanized rubber joints for sealing said compartment, substantially as specified.

11. In apparatus of the class described, a pair of flanged diaphragms having registering, angularly arranged grooves therein, and rubber vulcanized in said grooves, to secure said diaphragms together substantially as specified.

12. In apparatus of the class described, a cup comprising a flanged diaphragm having a groove therein, a socket intersecting said groove, and a vulcanized rubber seal engaging said groove and socket, substantially as specified.

13. In apparatus of the class described, a cup having a seat therein, a vulcanized rubber bushing engaged in said seat, a vulcanized rubber conduit having a socket registering with said bushing, and a vulcanized rubber nipple connecting said bushing and socket together, substantially as specified.

14. In apparatus of the class described, a containing vessel having a base provided with a passage and a socket, a conduit having a member seated in said socket and communicating with said passage, and a sealing device packed and vulcanized in said socket in engagement with said member, substantially as specified.

In testimony whereof I have hereunto set my hand this 7th day of February 1905, in the presence of the subscribing witnesses.

FRANK A. DECKER.

Witnesses:
ROBERT JAMES EARLEY,
UTLEY E. CRANE, Jr.